Sept. 30, 1969   R. L. MARTIN   3,470,506
HORIZONTAL LATCHING TYPE RELAY
Filed Oct. 30, 1968   2 Sheets-Sheet 2

ROBERT L. MARTIN
INVENTOR.

BY

Beehler & Arant
ATTORNEYS

United States Patent Office 3,470,506
Patented Sept. 30, 1969

3,470,506
HORIZONTAL LATCHING TYPE RELAY
Robert L. Martin, Thousand Oaks, Calif., assignor to Consolidated Electronic Industries, Inc., New York, N.Y., a corporation of Delaware
Continuation-in-part of application Ser. No. 634,144, Apr. 27, 1967. This application Oct. 30, 1968, Ser. No. 771,893
Int. Cl. H01h 9/20, 67/02, 67/06
U.S. Cl. 335—170        7 Claims

ABSTRACT OF THE DISCLOSURE

A latching type relay wherein two elongated armatures lie within the interior of a tubular coil form in which both are pivotally supported. The armatures extend outwardly of the tubular interior through magnetic plate pieces at the ends of the coil and there is a movable electric contact at one end of each armature insulated electrically from the armature. The movable contacts are moved into engagement with respective fixed contacts when electric coils around the coil form are energized. A permanent magnet is located midway between opposite ends of the coil form and north and south poles of the permanent magnet extend into the interior of the coil form to locations adjacent opposite sides of the armatures at the pivot point, the permanent magnet serving to hold the armatures in the positions to which they have been moved by energization of the coils after the coils have been de-energized. By providing two electric coils wound one the reverse of the other, the armatures can be moved away from latched position by energizing the coils in the opposite direction.

---

This is a continuation-in-part of applicant's copending application Ser. No. 634,144, filed Apr. 27, 1967, now Patent No. 3,414,852.

Although there is an appreciable variety of latching relays in conventional electric equipments, needs experienced in miniature and micro-miniature equipment are such that conventional mechanisms, although sound in principle, can be built only with difficulty in micro-miniature size. Relays with movable parts made in micro-miniature form are capable of assembly only under a microscope and none but skilled help can be depended upon to fit moving parts together properly. Moreover, because of the technical difficulties involved in working in an extremely small space electrical devices which need adjusting and calibrating often cannot be tolerated in micro-miniature form.

It is therefore among the objects of the invention to provide a new and improved magnetic latching relay of simple character and which is positive in action, sufficient to enable it to be readily manufactured in micro-miniature proportions.

Another object of the invention is to provide a new and improved magnetic latching relay which can be built in a horizontal posture and which will operate dependably and certainly in that posture.

Still another object of the invention is to provide a new and improved magnetic latching relay which combines the use of electromagnets and a permanent magnet in such fashion that although extremely simple in form and construction the permanent magnet is successful in holding the magnetic responsive armatures in whatever position they may be moved into by an electromagnet after the electromagnet has been de-energized, but only until the armature or armatures, as the case may be, are moved in an opposite direction by energization of another electromagnet.

Still another object of the invention is to provide a new and improved horizontal type magnetic latching relay which is simple in construction, thereby lending itself to a simple assembly procedure made possible by simple and inexpensive tooling, which is easily varied in size and proportion to meet very different capabilities, current load, etc., which is inexpensive in construction and which can be produced from relatively inexpensive materials in a form which is expressly dependable.

With these and other objects in view, the invention consists in the construction, arrangement, and combination of the various parts of the device, whereby the objects contemplated are attained, as hereinatfer set forth, pointed out in he appended claims and illustrated in the accompanying drawings.

In the drawings:

FIGURE 3 is a longitudinal sectional view taken on the line 3—3 of FIGURE 2.

Figure 4:
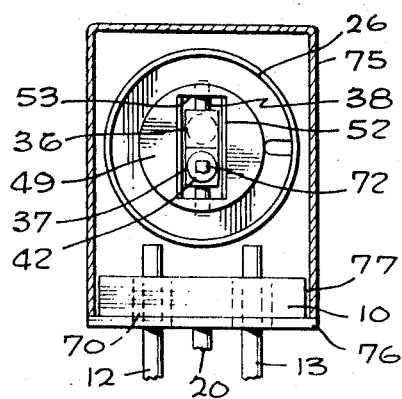
FIGURE 4 is a left end view of he device of FIGURE 2 with the surrounding housing shown in section.

In an embodiment of the invention chosen for the purpose of illustration there is shown a horizontal type latching relay device adapted to be mounted upon a substantially elongated rectangular header or base 10 of appropriate material from an upper face 11 of which extend 8 electric contact elements 12, 13, 14, 15, 16, 17, 18, and 19. A single coil common 20 extends downwardly from the lower side of the header or base 10, as shown in FIGURE 4.

A coil assembly indicated generally by the reference character 25 is housed within a magnetic sleeve 26 which extends throughout the length of the coil assembly. Centrally disposed in the coil assembly 25 is a tubular core 27 of nonmagnetic material and, in micro-miniature size, preferably of some material such as stainless steel. A central bore 28 extends through the core 27. At one end of the core 27 is a magnetic plate piece 29 and at the opposite end a similar magnetic plate piece 30, each being made of some appropriate magnetic material such as iron. In the plate piece 29 is an aperture 31 on one side of which is a magnetic pole 32. Similarly, in the other magnetic plate piece 30 is an aperture 33 on one side of which is a magnetic pole 34. Since the core 27 is of metallic material in the embodiment shown, the exterior surface of the core has applied to it an insulating coating 35 which extends over adjacent faces of the magnetic plate pieces 29 and 30 and adjacent surfaces of permanent magnets 54 and 55.

Centrally disposed within the bore 28 is a pair of elongated armatures 36 and 37. Both of these are pivotally supported by common pivot pin 38 which extends into appropriate holes 39 in the core 27 by which it is supported. At the right hand end of the armature 36 as viewed in FIGURE 1, there is a movable contact 40 attached to the end of the armature by means of an insulating adhesive 41. Similarly, at the left hand end of the armature 37 as viewed in FIGURE 1, is a movable contact 42 attached to the armature by an insulating adhesive 43.

Figure 1:
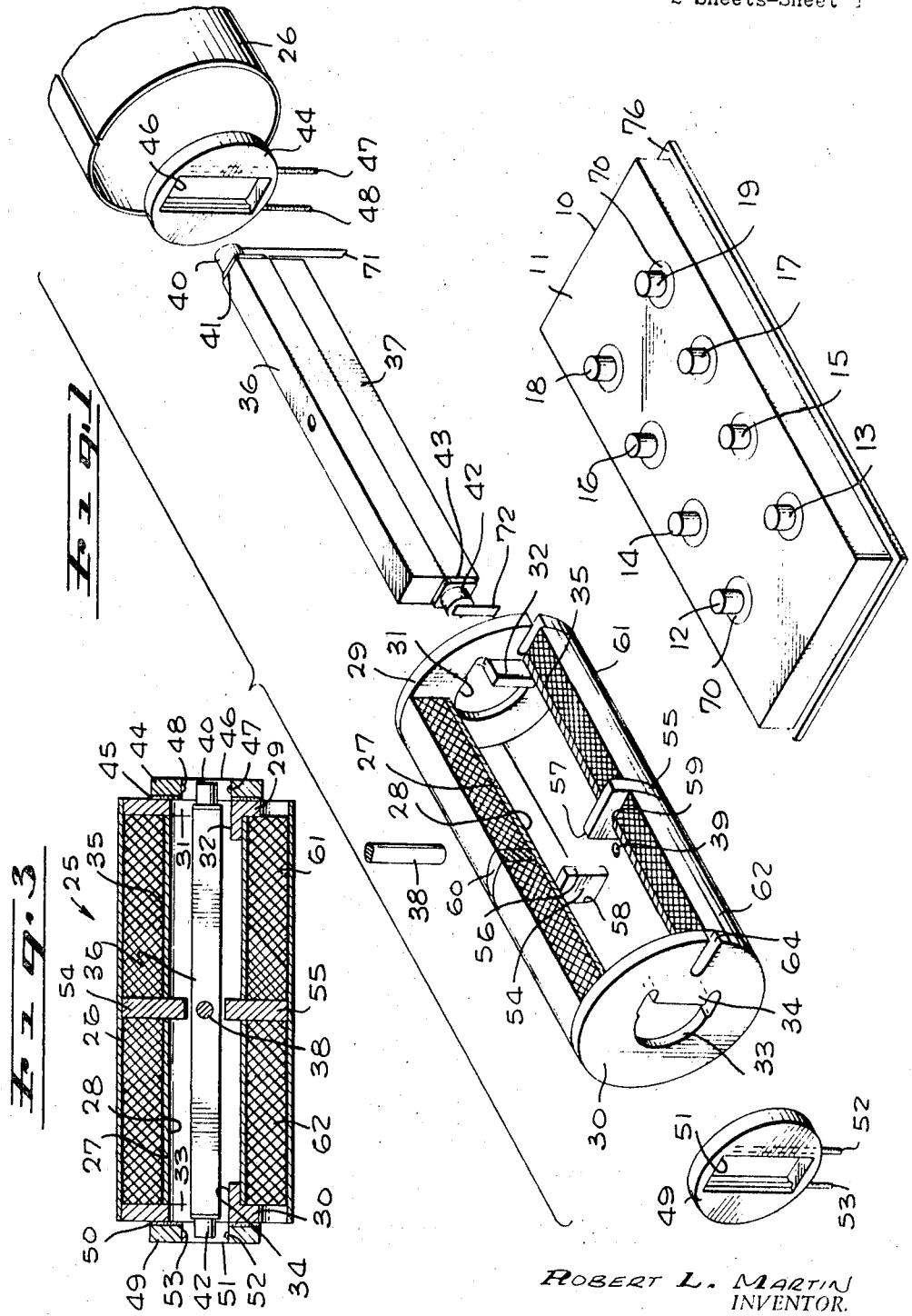
FIGURE 1 is an exploded perspective view of the sundry parts of the structure depicting several subassemblies in the general orientation occupied one with respect to the other.
Figure 2:
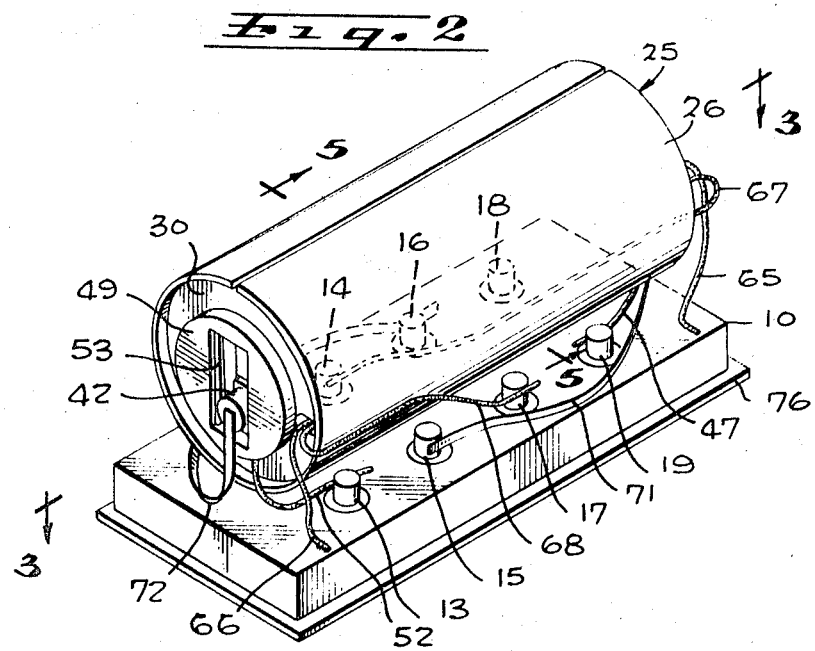
FIGURE 2 is a side perspective view of the device in assembled form.

At the right hand end of the coil assembly 25 as viewed in FIGURES 1 and 3 there is provided an insulating disc 44 fastened to the outside surface of the magnetic plate piece 29 by means of an appropriate adhesive 45. Extending through the insulating disc 44 is an opening 46 on one side of which is a fixed contact 47 and on the opposite side of which is a fixed contact 48. At the opposite or left hand end as viewed in FIGURES 1 and 2 is another insulating disc 49 attached to the respective plate piece 30 by an appropriate adhesive 50 and opening 51 extends through the insulating disc 49 in which are respective fixed contacts 52 and 53.

Figure 5:
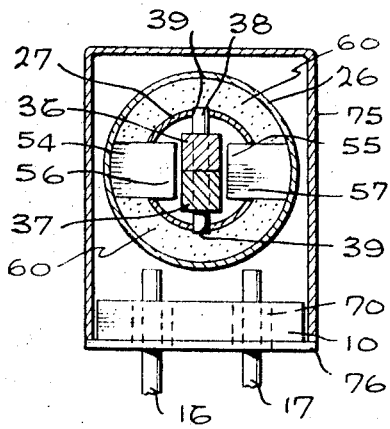
FIGURE 5 is a cross-sectional view on the line 5—5 of FIGURE 2.

Centrally disposed intermediate opposite ends of the coil assembly 25 are the permanent magnets 54 and 55 providing north poles 56 and 57. The permanent magnets are rectangular in form with curved surfaces on opposite ends coincident with the exterior of the coil assembly. The core 27 is provided with respective openings 58 and 59 through which the magnets extend. The poles at the inside ends extend sufficiently far into the bore 28 so that they closely approach but still clear respective opposite faces of the armatures 36 and 37, as readily viewed in FIGURES 3 and 5. The permanent magnets 54 and 55 may be held in place by a dielectric plastic potting 60. Surrounding the right hand end of the core 35, as viewed in FIGURES 1 and 3, is a coil 61 and a similar coil 62 surrounds the left hand end. A slot 63 is provided in the plate piece 29 for leads from the coil 61 and a slot 64 in the plate piece 30 provides for passage of leads from the coil 62. One lead 65 from the coil 61 and a lead 66 from the coil 62 are grounded on the header or base 10 from which extends the coil common 20. Although the base 10 is of electric conducting material, each of the electric contact elements is insulated from it by an appropriate insulating sleeve 70. A second lead 67 from the coil 61 is connected to the electric contact element or header pin 14. A second lead 68 from the coil 62 is connected to the electric contact element or header pin 17.

A pigtail 71 from the movable contact 40 at the right hand end of the armature 36 is connected to the electric contact element or header pin 15 and the pigtail 72 from the movable contact 42 at the left hand end of the armature 37 is connected to the electric contact element or header pin 16.

The fixed contact 47 at the right hand end of the coil assembly is connected to the electric contact element 19 and the fixed contact 48 is connected to the electric contact element 18. At the left end the fixed contact 52 is connected to the electric contact element 13 and the fixed contact 53 to the electric contact element 12.

In operation when the electric coil 61 is energized, the movable contact 42 is held against the fixed contact 53 by the force exerted by magnetic attraction at the pole 32, rotating the armature 37 about the pivot pin 38. At the opposite end the movable contact 40 is held against the fixed contact 47 by the force exerted by magnetic attraction of the pole 32 rotating the armature 36 about the pivot pin 38. Once in this position, when the coils are deenergized, the permanent magnets 54 and 55 exert sufficient force to hold the armatures 36 and 37 in the positions to which they have been pulled, in other words, latching the armatures to the positions to which they have been moved by previously energizing the coil. It should be borne in mind that dimension control of the fixed contacts 47, 48, 52 and 53, and the relationship, for example, of fixed contacts 47 and 52 to the respective magnetic poles 32 and 34 follows the same principle as outlined in Patent 3,335,376. Moreover, the relationship of the movable contacts 40 and 42 to the respective armatures 36 and 37 also remains the same as outlined in Patent 3,335,376.

Figure 6:
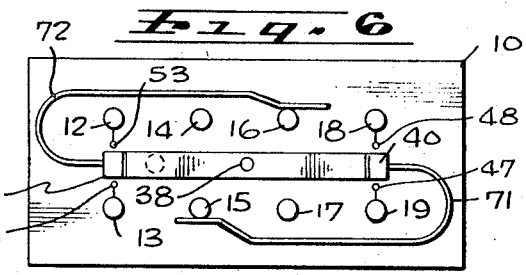
FIGURE 6 is a schematic plan view of the electrical connections.

After coil 61 has been de-energized and coil 62 energized, the armatures 36 and 37 are magnetically attracted to the magnetic pole 34 causing the armatures to again rotate about the pivot pin 38. The magnetic pull thus exerted by the coil 62 has sufficient force to overcome the force exerted by the permanent magnets 54 and 55 moving the armatures to the fixed contacts 52 and 48. The armatures are limited in travel to a location clear of the magnetic poles by engagement of the movable contacts with the fixed contacts completing an electric circuit between the respective contacts. The position of the contacts and armatures is as shown in FIGURE 6. The pigtails are flexible conducting connections from the movable contacts to the appropriate header pins, as has already been described. In the new positions to which the movable contacts have been moved by energization of the coil 62, the armatures and respective movable contacts will be held in that position by operation of the permanent magnets 54 and 55 until there is again energization of the opposite coil 61. Should energization of the same coil be repeated, the armatures and respective movable contacts will merely hold the positions to which they have been drawn.

It should be noted further that for structural rigidity the core 27, being of metal, is welded in engagement with the magnetic plate pieces 29 and 30, and that the magnetic sleeve 26 completes the magnetic path between the opposite plate pieces. Jig assembly of the parts assures proper clearance and spacing without need for subsequent adjustment once the device has been assembled, and also assures that when the movable contacts engage the respective fixed contacts there is still a clearance between adjacent portions of the respective armatures and the magnetic poles. Inasmuch as the coil assembly 25 is relatively light in weight compared to the strength and rigidity of the leads, the coil assembly can be supported by the leads when they are properly welded to the respective electrical contact elements, as has been previously described. Once the assembly has been completed, the entire assembly can then be encased within a housing or jacket 75 suitably attached to a flange 76 on the header 10, there being provided a seal 77 so that a chamber 78 within the housing 75 may either be exhausted by appropriate conventional means or filled with a suitable inert gas.

Having described the invention, what is claimed as new in support of Letters Patent is:

1. An electric latching relay comprising a coil form having a tubular nonmagnetic core and magnetic plate pieces extending across the ends of the core, said plate pieces each having an aperture therein in alignment with the tubular core, an armature having a pivotal mounting between opposite ends in said core and extending outwardly into said apertures, and a movable contact on one end of said armature in insulated relationship with said armature, a permanent magnet intermediate said plate pieces and having a pole extending into said core to a location adjacent said armature adjacent said pivotal mounting, an insulating element having an opening therein encompassing said movable contact, said insulating element being secured in position with respect to the adjacent plate piece, and fixed contacts on said insulating element in a position of potential engagement with said movable contact, and an electric coil on said coil form, whereby when said coil is energized the armature is moved by magnetic attraction to a position wherein said movable contact engages a fixed contact and remains held in said position by magnetic attraction of the permanent magnet after the coil has been de-energized.

2. An electric latching relay as in claim 1 wherein there are two permanent magnets located opposite each other on respective opposite sides of the armature.

3. An electric latching relay as in claim 1 wherein there are two electric coils effective to move said armature in respective opposite directions about said pivotal mounting.

4. An electric latching relay as in claim 2 wherein said coils are on opposite longitudinal sides of said permanent magnet.

5. An electric latching relay as in claim 1 wherein there are two armatures with pivotal mountings in said core, and a movable contact on one end of each.

6. An electric latching relay as in claim 1 wherein the armatures move in the same direction.

7. An electric latching relay as in claim 5 wherein there are two electric coils located to move said armatures in respective opposite directions.

References Cited

UNITED STATES PATENTS

| 2,946,876 | 7/1960 | Lockwood | 335—125 |
| 3,005,071 | 10/1961 | Brunicardi | 335—125 |
| 3,109,903 | 11/1963 | Lychyk | 335—125 |
| 3,147,349 | 9/1964 | Welch | 335—125 |
| 3,178,532 | 4/1965 | Smith | 335—125 |

BERNARD A. GILHEANY, Primary Examiner

H. BROOME, Assistant Examiner

U.S. Cl. X.R.

335—125